United States Patent
Lorey et al.

(10) Patent No.: US 7,810,884 B2
(45) Date of Patent: Oct. 12, 2010

(54) VEHICLE SEAT WITH SLIDE VALVE

(75) Inventors: Konstantin Lorey, Schmidgaden (DE); Erwin Haller, Birgland (DE); Thomas Burger, Nabburg (DE)

(73) Assignee: Grammer AG, Amberg (DE)

( * ) Notice: Subject to any disclaimer, the term of this patent is extended or adjusted under 35 U.S.C. 154(b) by 140 days.

(21) Appl. No.: 12/215,377

(22) Filed: Jun. 26, 2008

(65) Prior Publication Data
US 2009/0008977 A1    Jan. 8, 2009

(51) Int. Cl.
*A47C 1/00* (2006.01)
(52) U.S. Cl. .................................. 297/344.16
(58) Field of Classification Search ........... 297/344.16, 297/344.19, 344.12; 248/188.2, 188.4, 404, 248/421, 585, 588
See application file for complete search history.

(56) References Cited

U.S. PATENT DOCUMENTS

| | | | | |
|---|---|---|---|---|
| 4,946,145 A | * | 8/1990 | Kurabe | .......................... 267/131 |
| 5,651,585 A | * | 7/1997 | Van Duser | .............. 297/344.16 |
| 2008/0197684 A1 | * | 8/2008 | Ott et al. | ................. 297/344.16 |

FOREIGN PATENT DOCUMENTS

| DE | 202007002243 | 5/2007 |
|---|---|---|
| EP | 1 844 979 | 10/2007 |

* cited by examiner

*Primary Examiner*—Milton Nelson, Jr.
(74) *Attorney, Agent, or Firm*—Ballard Spahr LLP

(57) ABSTRACT

The invention relates to a vehicle seat with a height-adjustable seat frame which comprises at least two seat frame parts which can move relative to one another and at least one fluid spring, in particular an air spring, arranged on the seat frame parts for height adjustment purposes, with at least one control device which is provided for influencing the fluid spring and which comprises at least one valve device with control valves which is attached to the first seat frame part and is designed to control fluid flows for the fluid spring, and also a control element which is provided on a second seat frame part and is designed to actuate the control valves, so that a height adjustment and/or damping oscillatory movement of the vehicle seat is ensured, wherein the valve device comprises an internally cylindrical component with at least one rod element arranged displaceably therein as a control element, wherein at least one fluid intake and discharge opening of the rod element can selectively be assigned to one of the control elements by a relative displacement of the cylindrical component and the rod element with respect to one another.

12 Claims, 15 Drawing Sheets

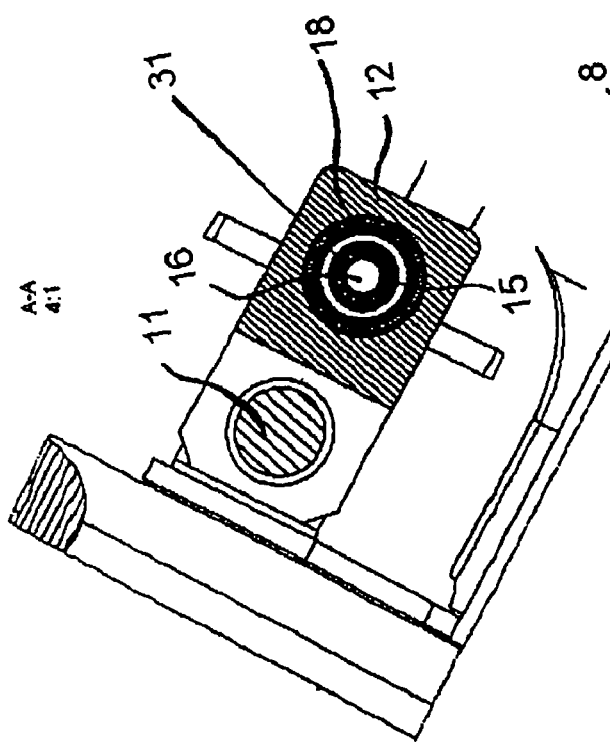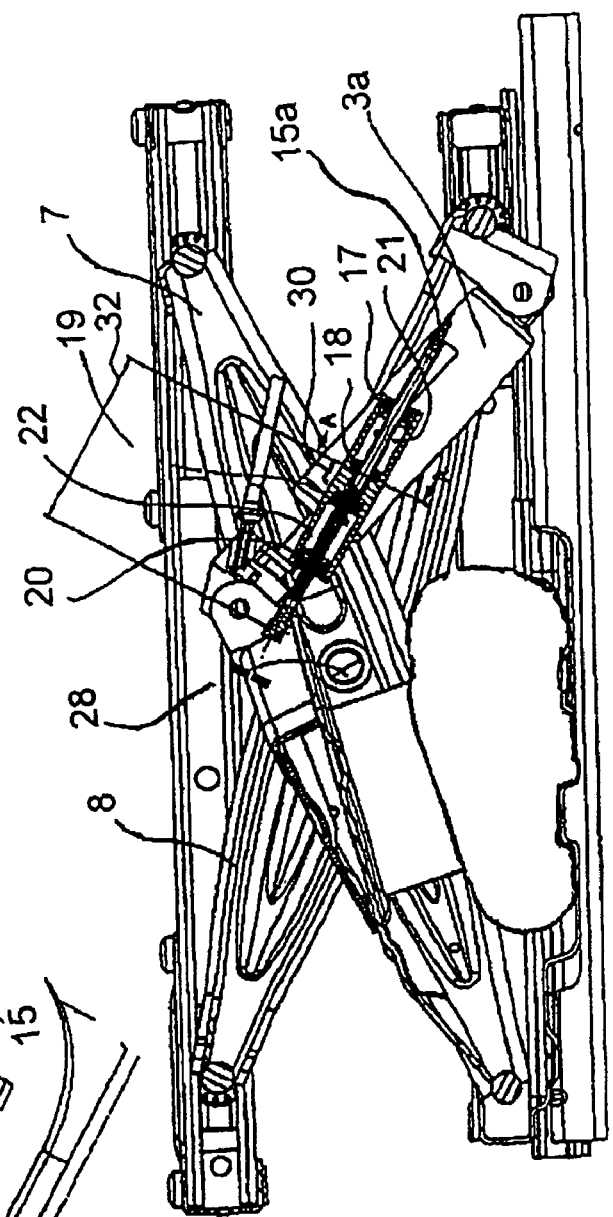
FIG. 7B
FIG. 7A

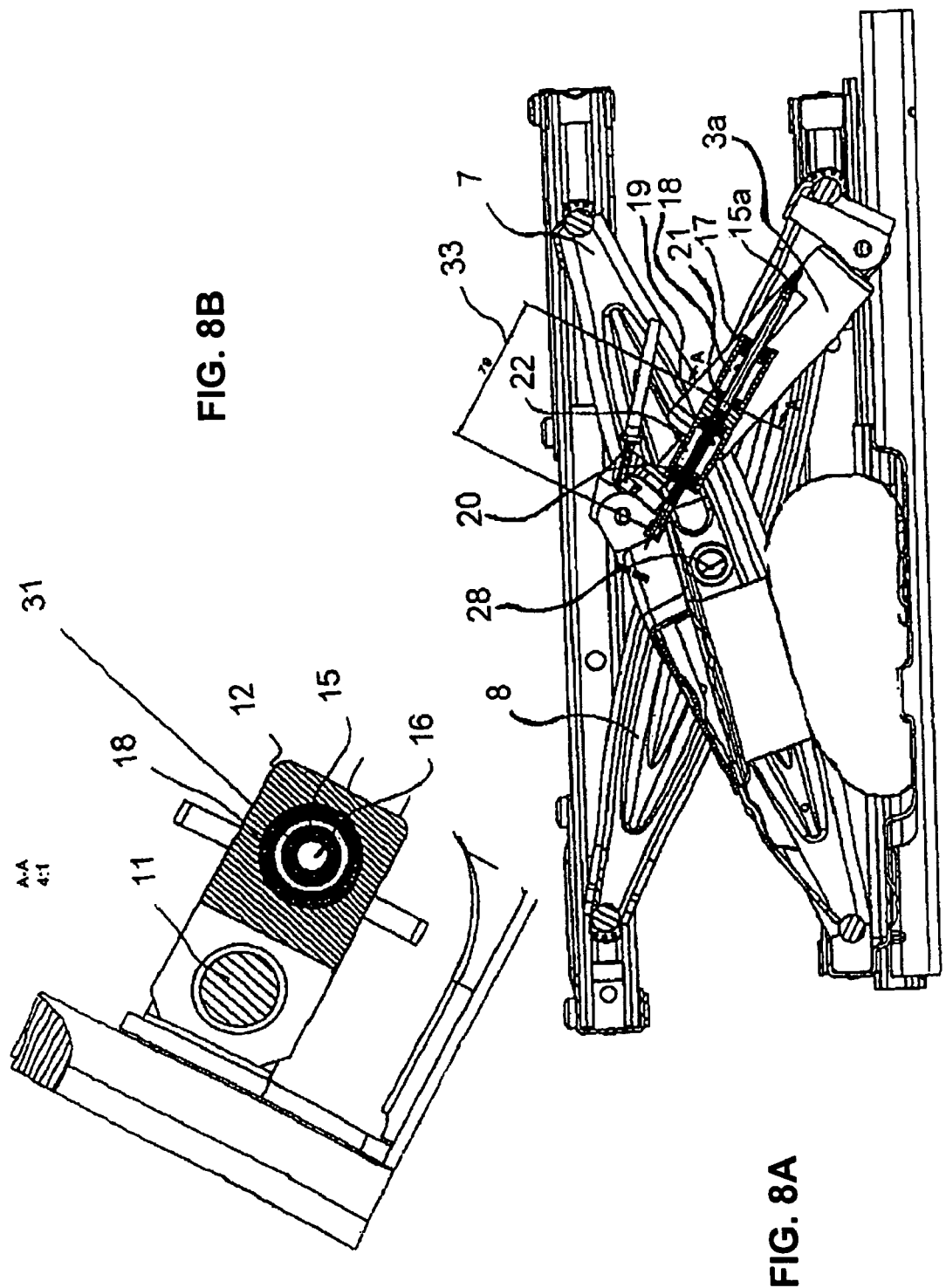

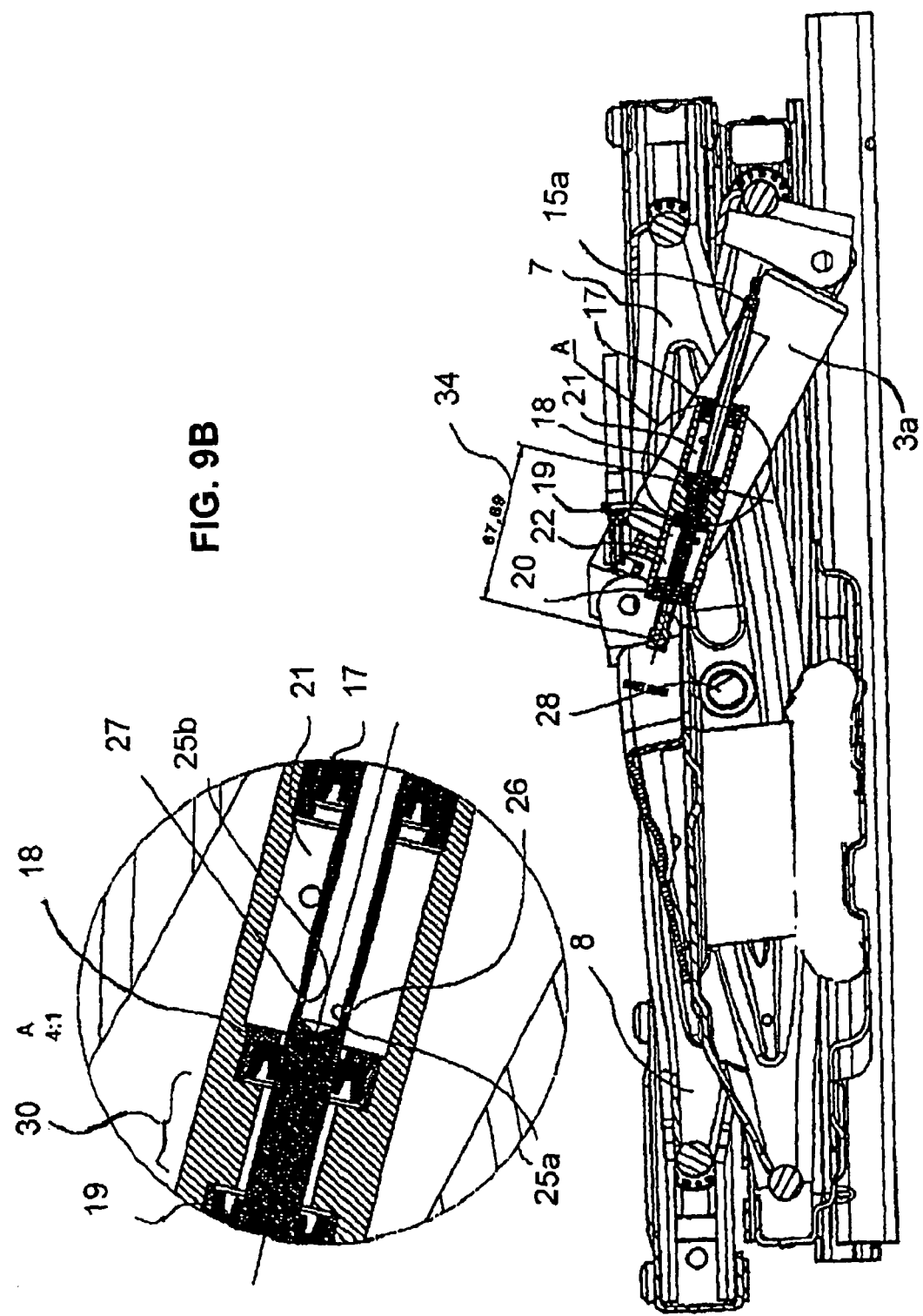

VEHICLE SEAT WITH SLIDE VALVE

CROSS REFERENCE TO RELATED APPLICATIONS

This application is a convention application of German Application Serial Number 10 2007 030 467.8, filed Jun. 29, 2007, which application is hereby incorporated by this reference in its entirety.

BACKGROUND OF THE INVENTION

The invention relates to a vehicle seat with a height-adjustable seat frame which comprises at least two seat frame parts which can move relative to one another and at least one fluid spring, in particular an air spring, arranged between the seat frame parts for height adjustment purposes, with at least one control device which is provided for influencing the fluid spring and which comprises at least one valve device with control valves which is attached to the first seat frame part and is designed to control fluid flows for the fluid spring, and also a control element which is provided on a second seat frame part and is designed to actuate the control valves, according to the preamble of claim 1.

EP 0 710 606 2 discloses a vehicle seat with a height-adjustable seat frame which is composed of two seat frame parts which can move in a scissors-like manner with respect to one another and of a seat surface arranged thereon and has a control link which is attached to one seat frame part and also a valve device with control valves which is connected to the other seat frame part and is designed to control gas flows for a fluid spring. A control device composed of this valve device with the control valves and the control link serves for adjusting the height of the scissors-type seat frame parts by means of the fluid spring, by supplying air to or discharging air from the latter. By means of an adjustment device and regardless of a relative position of the seat frame part, the control link is adjusted by a relative movement with respect to the second seat frame part such that a movement of the control link relative to the second seat frame part brought about by the adjustment device causes a height adjustment of the vehicle seat. Here, the control link is designed in the manner of a disc and is able, through its rotational movement, to operate control levers so as to actuate the control valves. The rotational movement of the control link can be carried out by means of a latching mechanism. Such latching mechanisms disadvantageously require adaptation to the switching travels of the control valves, in order to ensure a functional reliability of the height adjustment. The resulting tolerances that have to be taken into account as a result of the required adaptation could lead to an undesired premature or late switching of the control valves.

In addition, in order to carry out the normal oscillatory suspension movement without any desired height adjustment, there is a paramount need for a small throttle cross section on the control valves in order to obtain an optimised oscillatory movement of the vehicle seat in the height direction. However, when simultaneously using the control device for desired height adjustments, this leads to long lifting times of the vehicle seat, since only a small supply of air via the inlet throttle path is possible for such a desired height adjustment. Therefore, only a very slow height adjustment is possible.

SUMMARY OF THE INVENTION

Accordingly, the object of the present invention is to provide a vehicle seat with a height-adjustable seat frame which, by means of a fluid spring, in particular an air spring, and a control device, is able to carry out height adjustments and oscillatory movements, said vehicle seat allowing a height adjustment at a selectable speed and an optimised air intake to and discharge from the air spring as a function of the spring travel of the air spring.

The core concept of the invention is, in a vehicle seat with a height-adjustable seat frame which comprises at least two seat frame parts which can move relative to one another and at least one fluid spring arranged between the seat frame parts and a base for height adjustment purposes, with at least one control device which is provided for influencing the fluid spring and which comprises at least one valve device with control valves which is attached to the first seat frame part and is designed to control fluid flows for the fluid spring, and also a control element which is provided on a second seat frame part and is designed to actuate the control valves, so that a height adjustment and/or damping oscillatory movement of the vehicle seat is ensured, the valve device comprises an internally cylindrical component with at least one rod element arranged displaceably therein as a control element. The rod element is provided with at least one fluid intake and discharge opening which can selectively be assigned to one of the control valves by a relative displacement of the cylindrical component and the rod element with respect to one another. Such a slide valve, which is preferably arranged next to a damping element, not only advantageously allows a precise adaptation of the quantity of air supplied to and discharged from the air spring for the current spring travel of the air spring, but also allows a simplified design of such a height adjustment device since there is no longer any need to use control links of complicated construction with latching devices and the like. This also results in low manufacturing costs.

A fluid spring is to be understood to mean both a gas spring and also a spring which functions on the basis of fluid supplied thereto and discharged therefrom. Such a gas spring may in particular be designed as an air spring. Accordingly, the fluid flows may be gas flows, in particular air flows, or liquid flows. The fluid intake and discharge opening can likewise be configured as an intake and discharge opening for gases, in particular air, or liquids.

The air spring may be arranged between one of the seat frame parts and on a base of the vehicle seat, preferably in the vertical direction, so that the forces act on the vehicle seat preferably in the vertical direction. Of course, such an air spring may also be arranged in some other way, such as for example between the two scissors-type frames that can move relative to one another.

During a normal oscillatory movement of the vehicle seat, as a result of the proportional excursion of the gas spring relative to the internally cylindrical component, a respectively adapted quantity of air is supplied to or discharged from the gas spring in a targeted manner in order to improve the damping properties thereof. This results in a very good oscillatory property of the vehicle seat in the height direction.

Preferably, the gas intake and discharge opening on the surface of the rod element is provided with at least one notch extending in the longitudinal direction of the rod element with a deepest point in the centre with reference to the longitudinal direction, wherein according to one preferred embodiment the notch may extend at an angle with respect to the longitudinal direction of the rod element or is formed in the longitudinal direction of the rod element. Due to the different depths, such a notch allows a targeted supply and discharge of air in a desired quantity so that, during a desired, e.g. manual, height adjustment of the vehicle seat, a low air throughput is obtained for a small movement of the actuation element or a single actuation of the height adjustment actuation element. This results in a gentle, precise movement of the vehicle seat undergoing height adjustment towards the desired point.

Likewise, a medium air throughput is obtained when the height adjustment actuation element is actuated twice, or a high air throughput is obtained when it is actuated three times or in the case of rapid lowering actuation, resulting in a faster movement of the height-adjustable vehicle seat which is slowed upon reaching the desired target position.

The gas intake and discharge opening on the surface of the rod element may comprise at least several bores arranged one behind the other in the longitudinal direction of the rod element or arranged one behind the other at an angle with respect to the longitudinal direction of the rod element, said bores having diameters which increase from bore to bore. This likewise allows a greater or lesser intake and discharge of air to and from the gas spring, depending on which bore the air passes through. Ideally, the bores are arranged in such a way that the bore with the largest diameter is arranged centrally in the running direction of the bores, and bores with increasingly smaller diameters are arranged towards the ends.

The internally cylindrical component has at least two sealing elements which annularly surround the rod element and are designed to form at least two separate gas chambers arranged one behind the other within a cylinder jacket of the cylindrical component, so that as a result the gas intake and discharge opening allows a greater or lesser supply and discharge of air to or from the gas chambers upon passing over the sealing element by a selectable distance during a desired height adjustment. Ideally, in this case, a first gas chamber is connected to the first control valve and is at an overpressure that is built up pneumatically by means of an external air source. A second chamber is connected to the second control valve and is at normal atmospheric pressure in order thus to serve for air discharge purposes via the second control valve arranged thereon when air is supplied into this chamber via the air intake and discharge opening. By contrast, the first gas chamber is provided so that it passes air via the air intake and discharge opening to the gas spring, wherein in this case advantageously the rod element has along its longitudinal direction, at least partially, a cavity with a gas spring connection opening at its first end and the gas intake and discharge opening at its second end.

An adjustment device arranged at the end of the rod element serves to adjust the displaceable rod element by a relative movement with respect to the internally cylindrical component such that a movement of the rod element relative to the cylindrical component that is brought about by the adjustment device causes a height adjustment of the vehicle seat at a predefinable speed by displacing the gas intake and discharge opening into the first or second gas chamber.

At least one spring element serves for applying a spring force to the adjustment movement of the rod element.

The rod element is suspended in an articulated manner on the second seat frame part, whereas the cylindrical component is suspended in an articulated manner on the first seat frame part.

BRIEF DESCRIPTION OF THE DRAWINGS

Advantages and expedient features will become apparent from the following description in conjunction with the drawing, in which:

FIG. 7a shows the vehicle seat frame with the height adjustment device according to the invention in a second position;

FIG. 7b shows, in a cross-sectional view along the section line A//A in FIG. 7a, the height adjustment device in a second position;

FIG. 8a shows the vehicle seat frame with the height adjustment device according to the invention in a third position;

FIG. 8b shows, in a cross-sectional view along the section line A//A, the height adjustment device in a third position;

FIG. 9a shows the vehicle seat frame with the height adjustment device according to the invention in a fourth position;

FIG. 9b shows a detail A, as marked in FIG. 9a;

DETAILED DESCRIPTION OF THE INVENTION

Figure 1A:
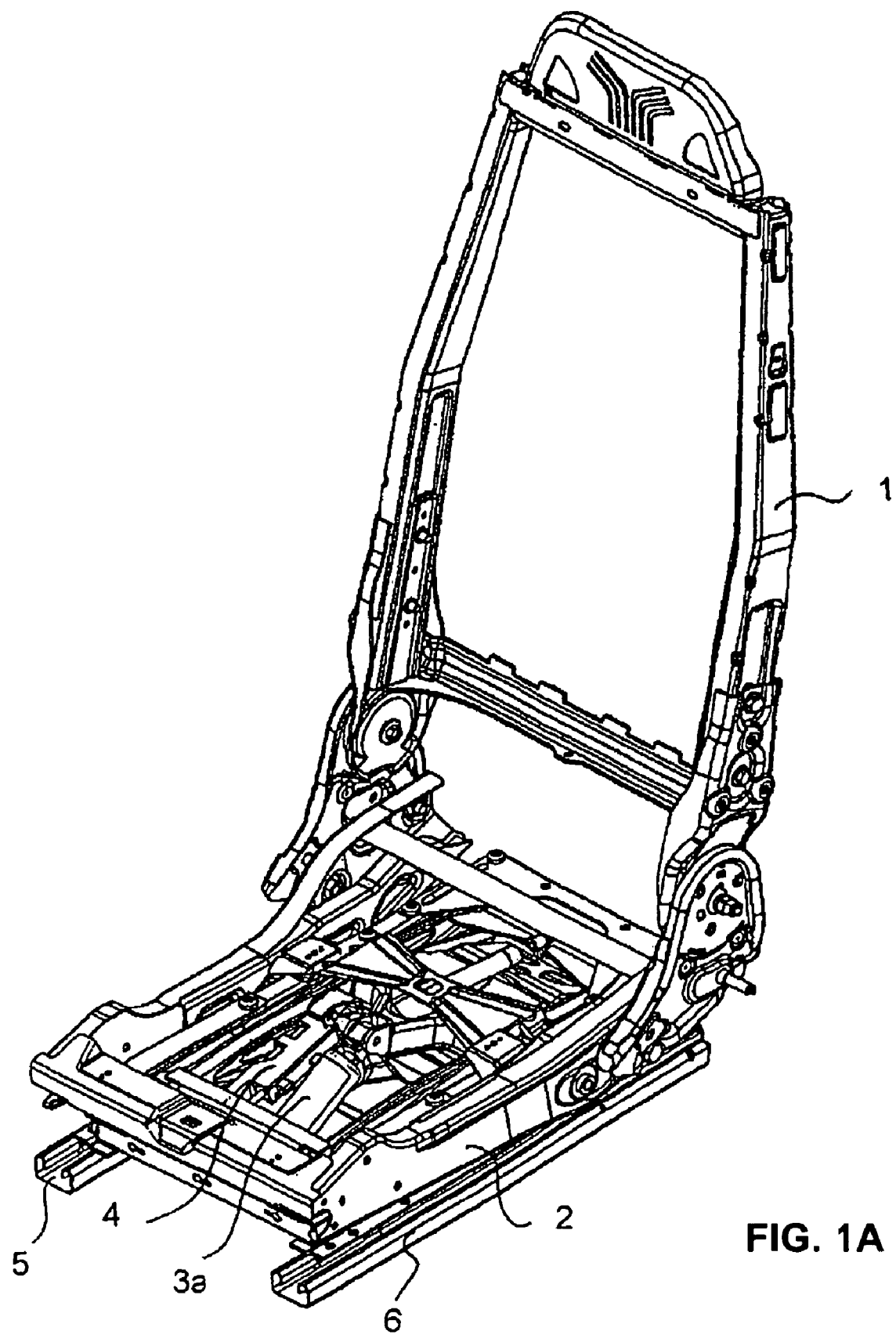
FIGS. 1a-c show a vehicle seat in various height positions.
Figure 1B:
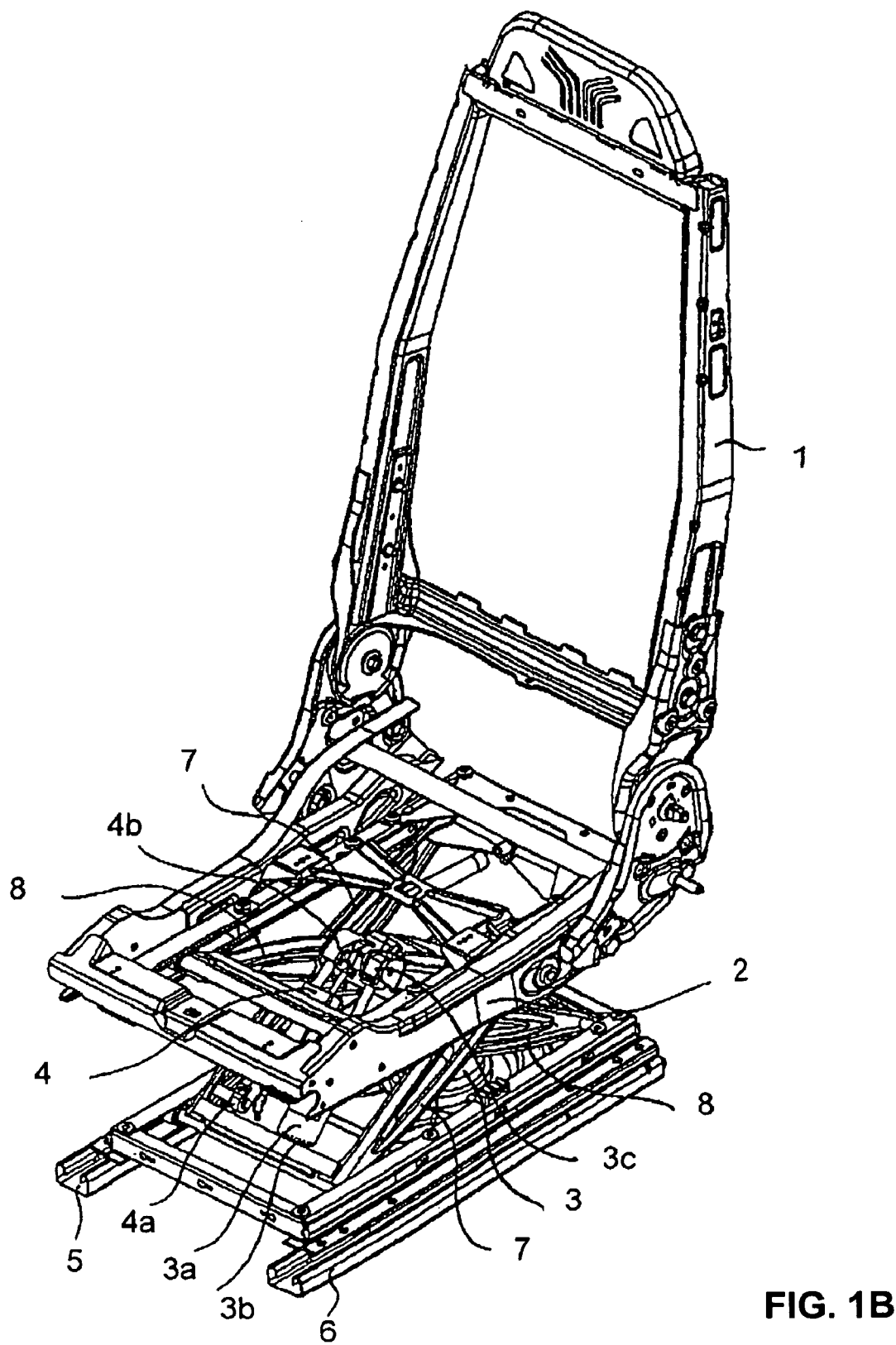
Figure 1C:
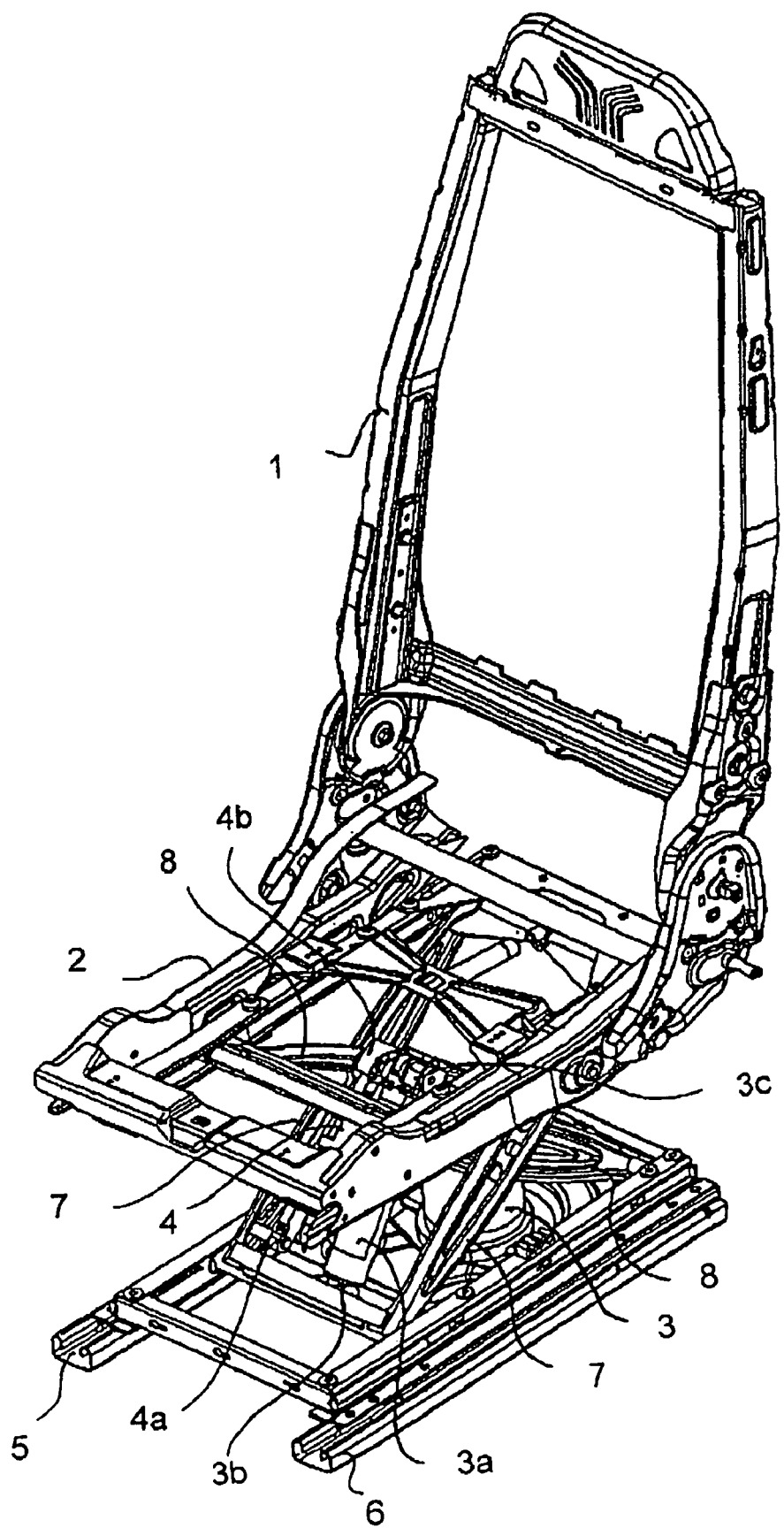

FIGS. 1A-C show a vehicle seat with a backrest 1 and a seat part 2, which is shown in various height positions. The lowest seat position of the vehicle seat in FIG. 1A shows a folded-together scissors-type seat frame with an air spring designed as a gas spring and with a control device 4 or height adjustment device.

The air spring 3 (not seen on FIG. 1A; See FIGS. 1B and 1C) is connected by a lower end to a base of the vehicle seat or a body part or another element (not shown) that is fixedly connected to the body, and is connected by an upper end to at least one part of the scissors-type seat frame.

The seat is arranged on rails 5, 6 such that it can be displaced in the forward and backward direction.

FIGS. 1B and 1C show the first seat frame part 7 and the second seat frame part 8, wherein both the control device 4 and a spring-type damping element 3a are attached by first ends 3b and 4a to the bottom of the first seat frame part 7 and by second, upper ends 3c and 4b to the second seat frame part 8.

When the vehicle seat is moved in the upward direction in FIG. 1C, both the damping element 3a and the control device 4 are in an extended state.

Figure 2:
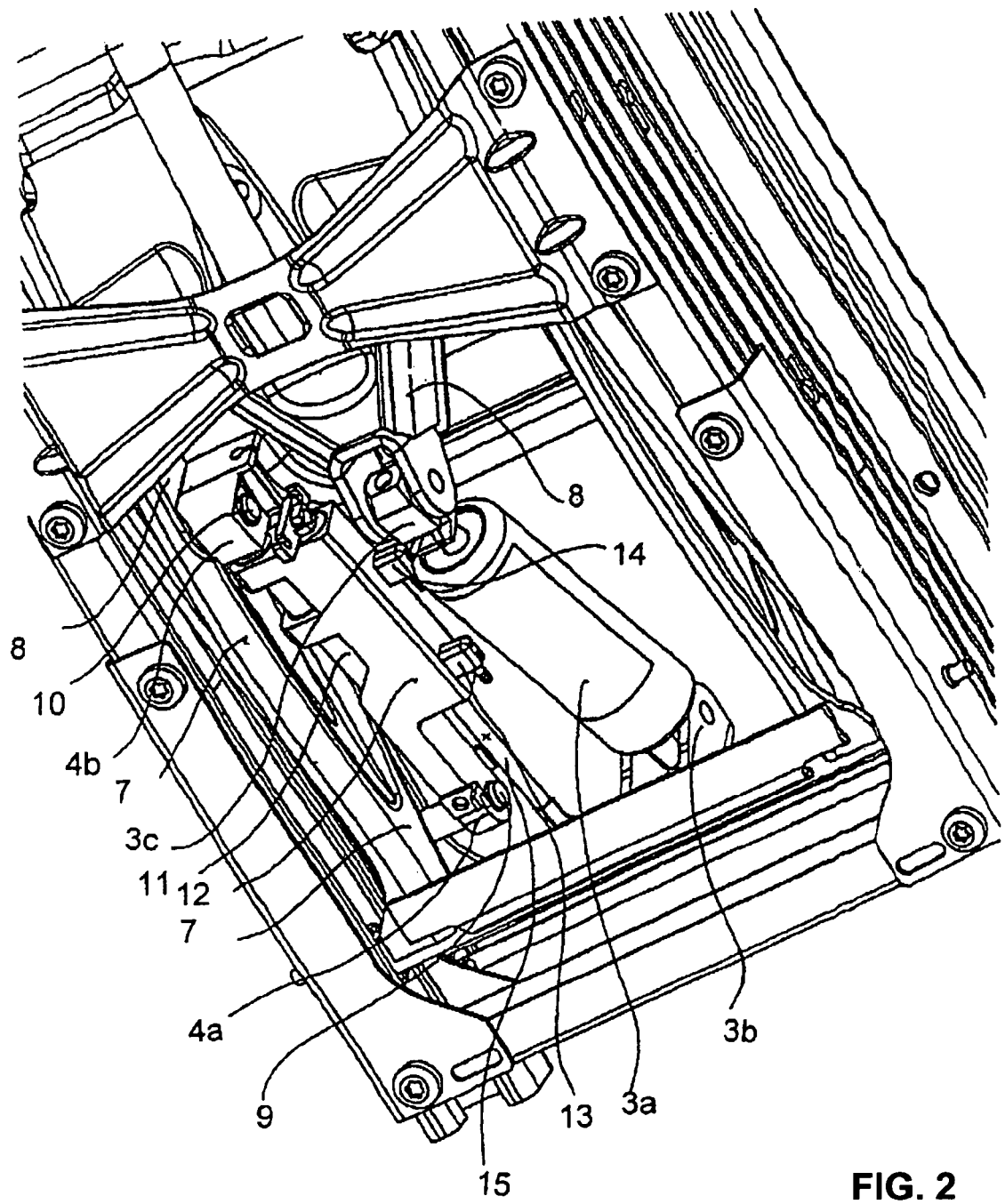
FIG. 2 shows a perspective view of part of the vehicle seat frame with a height adjustment device arranged therein and an air spring.

FIG. 2 shows part of the vehicle seat frame in the region of the damping element 3a and the control device 4. The control device 4 consists of an internally cylindrical component 12, which at the bottom is arranged with the end 4a articulated about a pivot pin 9 on the first seat frame part 7, which has a groove on the outer side.

The internally cylindrical component 12 is arranged such that it can be displaced with respect to a shaft 11 and has control valves 13 and 14 on the outer side.

The shaft 11 is attached at the top to the seat frame part 8 by means of a pivot pin 10.

Figure 3:
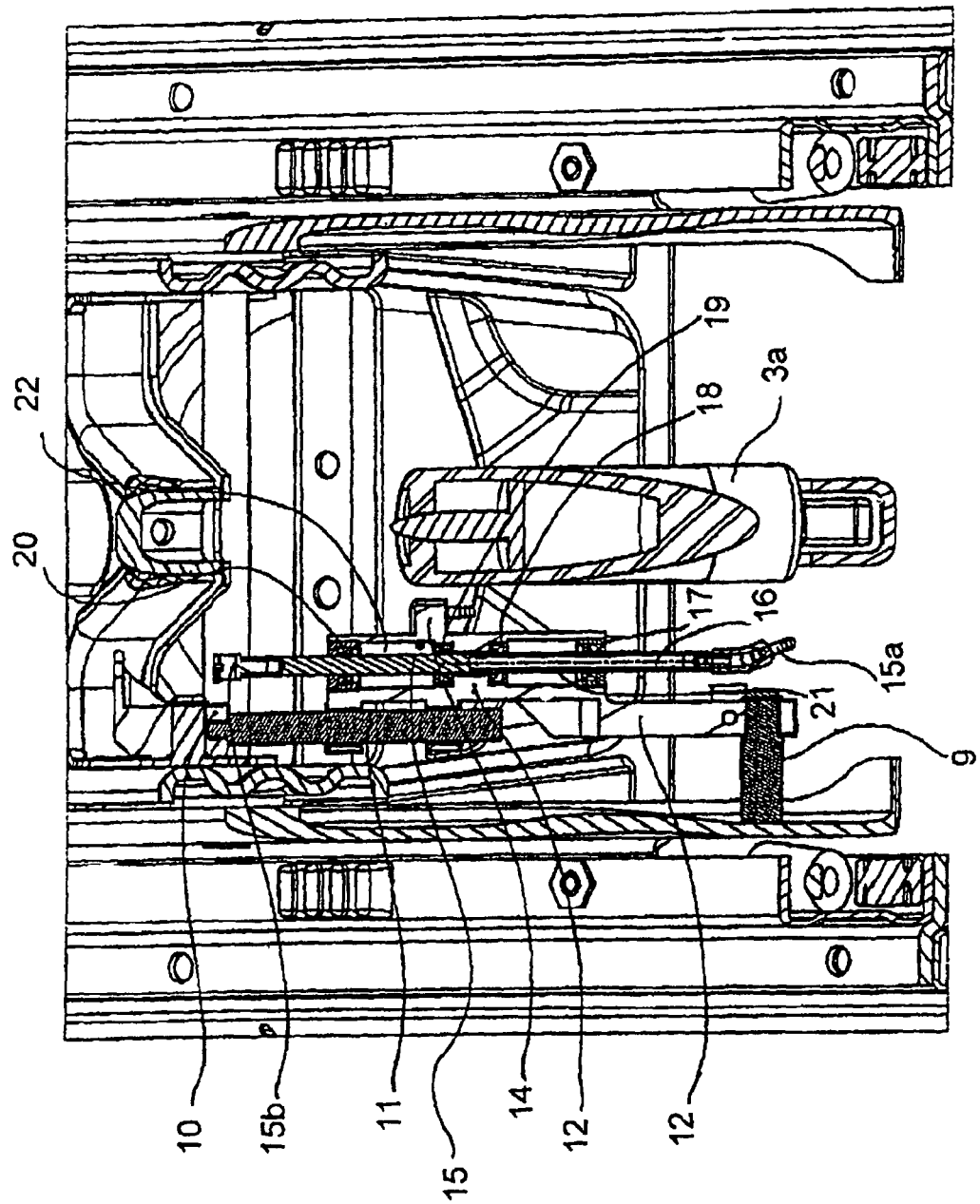
FIG. 3 shows a view, in partial cross section, of part of a vehicle seat frame with the air spring and the height adjustment device.

A rod element 15, which is arranged such that it can be displaced within the internally cylindrical component 12, is arranged in a fixed position at its upper end 15b relative to the second seat frame part 8, as can be seen from FIG. 3.

The rod element 15 has at the bottom at its lower end 15a a gas spring connection opening which is connected to a cavity 16 within the rod element 15.

The rod element 15 is arranged within the component 12 by means of annular sealing elements 17, 18, 19 and 20, wherein the sealing elements separate two gas chambers 21, 22 arranged in a cylinder jacket of the component 12. The first gas chamber 21 contains air at an overpressure, whereas the second gas chamber 22 is at normal pressure, i.e. atmospheric pressure.

Figure 4:
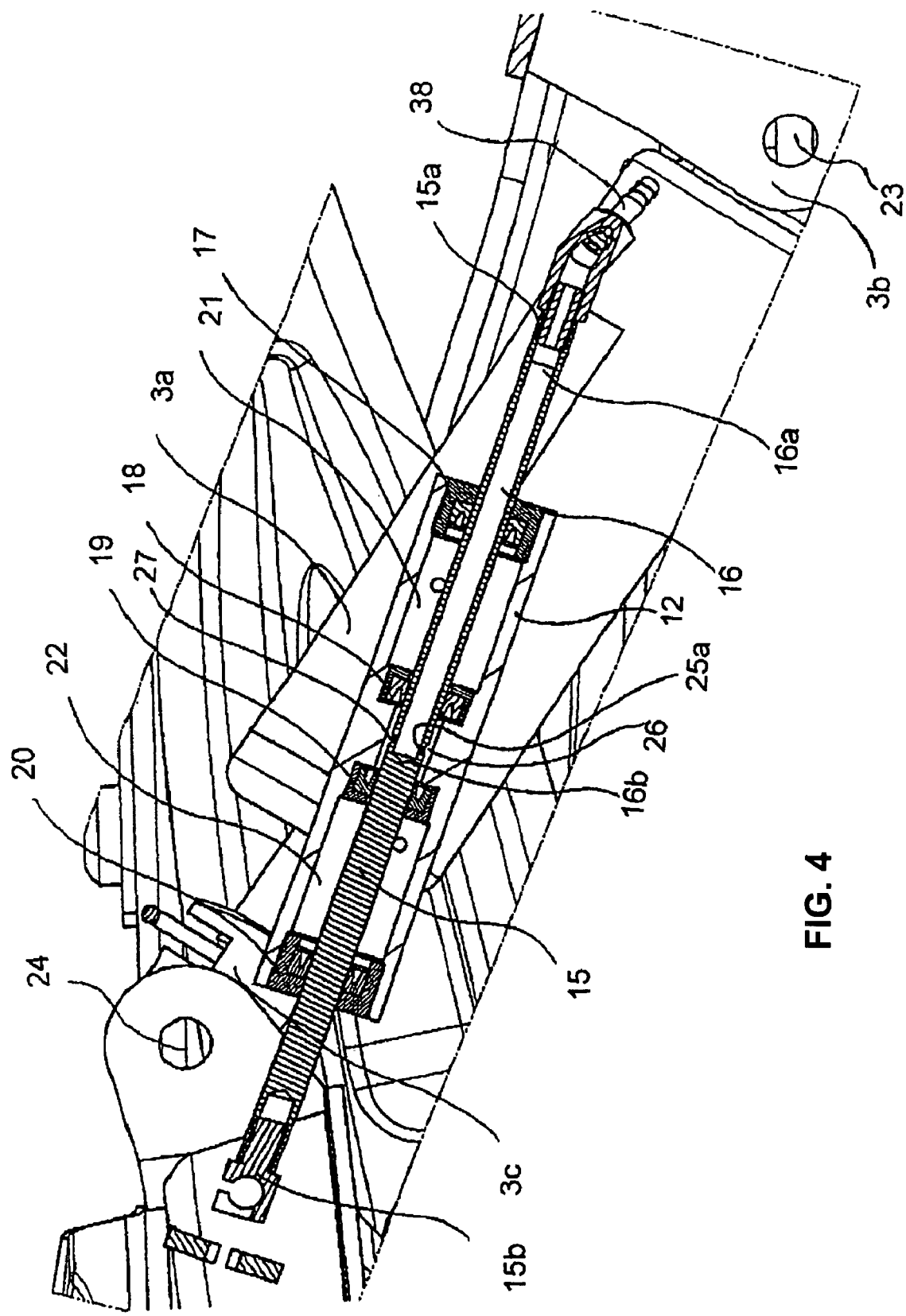
FIG. 4 shows, in a side view, part of the vehicle seat with the height adjustment device in cross section in a first operating position.

FIG. 4 shows a cross section through part of the vehicle seat frame with the slide valve or control device 4 arranged therein. The slide valve is shown in a first slide position in FIG. 4 and in a second slide position in FIG. 5.

It can clearly be seen from the view of the slide valve shown in FIG. 4 that the bore 16 within the rod element 15 has a gas spring connection 38 at its first end 16a and, at its second end 16b, on the left and on the right or at the top and at the bottom, two openings 25a with adjoining notches 26, 27 which are formed in the surface of the rod element 15 and which are illustrated in greater detail with reference to FIGS. 10A, 10B, 11A, 11B and 12A-C.

In the neutral position (shown here) of these gas intake and discharge openings 25a, 26, 27 between the two gas chambers 21, 22 and the two seals 18, 19, air is neither supplied to nor discharged from the gas spring, which in respect of air intake and discharge is connected via the element 38 to the slide valve.

Figure 5:
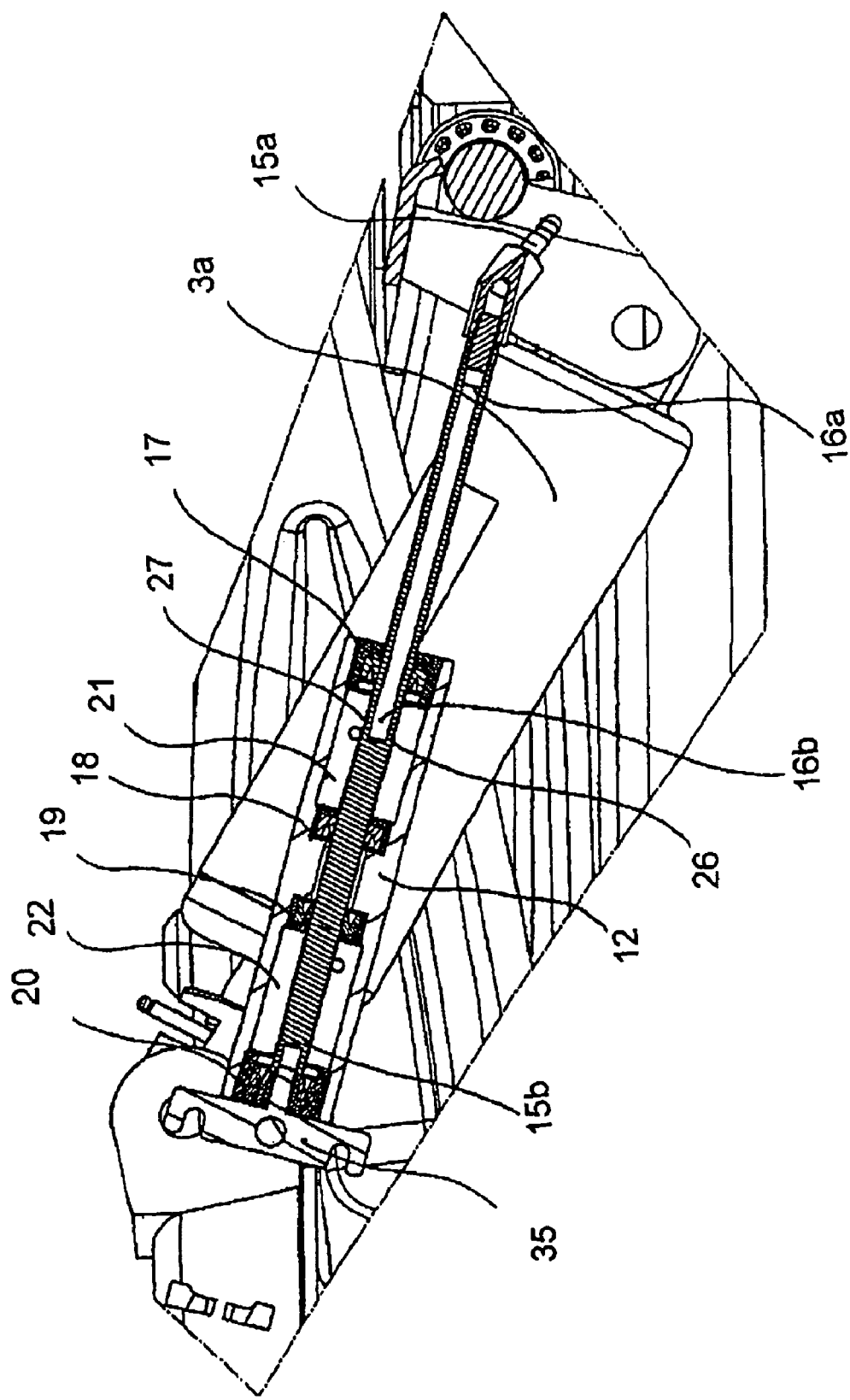
FIG. 5 shows part of the vehicle seat with a height adjustment device in cross section in a second operating position.

By contrast, in the position of the rod element 15 and thus of the second end 16b of the bore 16 shown in FIG. 5, the openings 26, 27 are located in the region of the first gas chamber 21, which is at an overpressure and thus supplies air to the gas spring via the openings 26, 27 and the bore 16 and also the element 38.

FIGS. 6A, 6B, 7A, 7B, 8A, 8B and 9A, 9B show the vehicle seat frame with the control device and/or the height adjustment device and/or the slide valve in various height adjustment positions. When a height adjustment actuation element is actuated, the rod element 15 can be displaced downwards or upwards in relation to the internally cylindrical component 12 by means of an adjustment device (shown in greater detail in FIG. 13) in the form of a Bowden cable 40 at its upper end 15b, in order thus to arrange the gas or air intake and discharge openings either in the region of the gas chamber 21 or in the region of the gas chamber 22 or in a section 30 arranged therebetween.

Figure 6B:
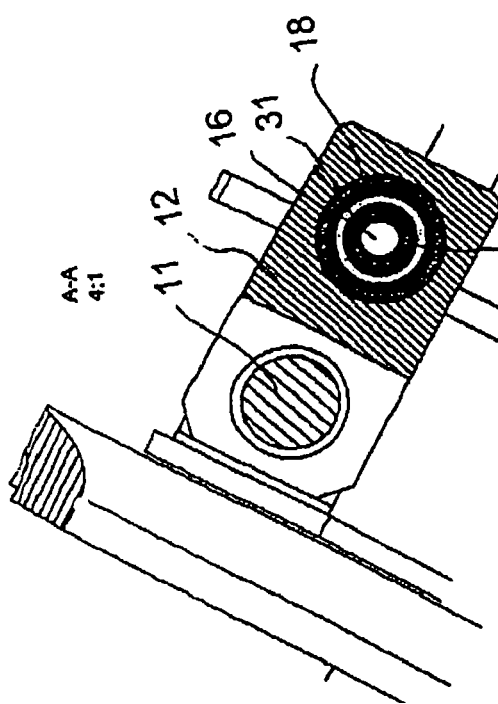
FIG. 6b shows, in a cross-sectional view along the section line A//A in FIG. 6a, the height adjustment device in the first position.
Figure 6A:
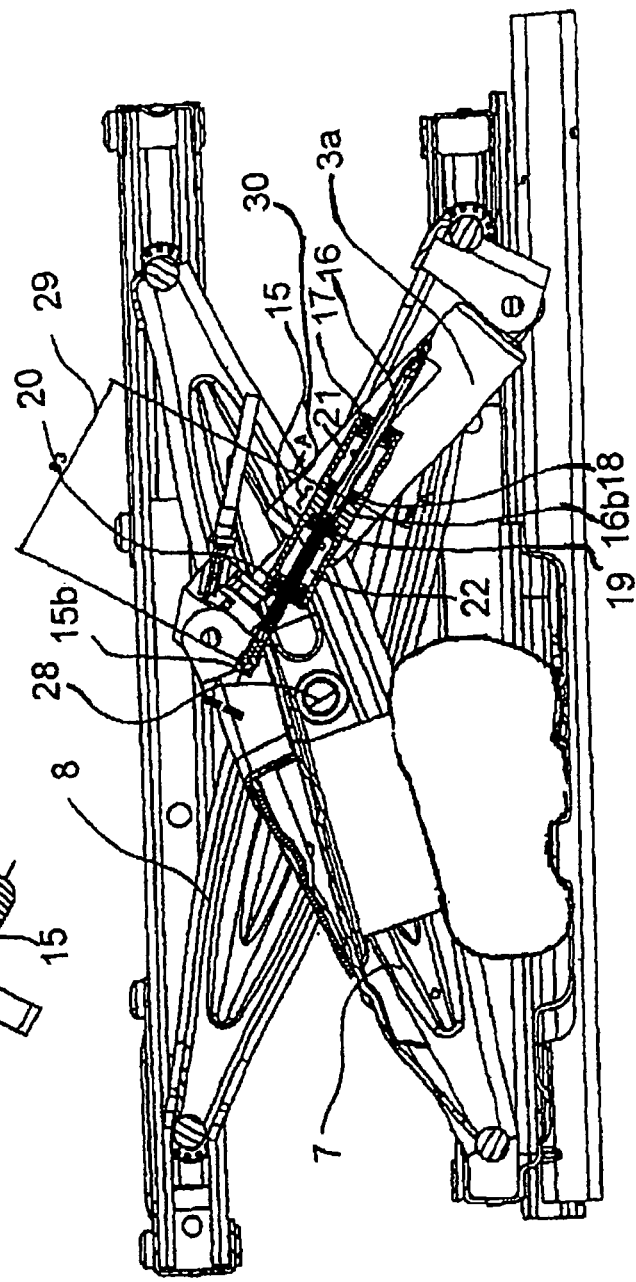
FIG. 6a shows the vehicle seat frame with the height adjustment device according to the invention in a first position.

In the neutral position of the rod element 15 with respect to the component 12 shown in FIGS. 6A and 6B, the gas intake and discharge openings and thus the end 16b of the bore 16 are arranged in the section 30 in which there is no access to a gas volume for the openings.

This can also be seen from the cross section shown in FIG. 6B along the line A//A according to FIG. 6A, which shows that no air can escape or be supplied between the sealing element 18 and the surface of the rod element 15.

The rod element is pushed into the component 12 by one step in FIG. 7 and by two steps in FIG. 8, in order thus to achieve a desired height adjustment. The different distances are illustrated by references 29, 32, 33 and in FIG. 9A by reference 34.

By comparing FIGS. 6A, 7A, 8A and 9A, it can be seen that the end 16b of the bore 16 is increasingly pushed in the direction of the air intake chamber 21, wherein, in the rod element end position shown in FIG. 7A, the notch 26, 27 is arranged with a first part and in FIG. 8A with a second part in the region of the chamber 21. This means that it is not the entire notch that allows an entry of the air at an overpressure within the chamber 21 into the bore 16 and thus the gas spring, but rather a metering of the supplied air takes place. This is achieved by the notch effect with different depths, as will be described in further detail below in connection with FIGS. 10A, 10B for example.

In the region of reference 31 shown in FIGS. 6B, 7B and 8B, an opening of greater or lesser size for supplying air into the opening 16 is thus obtained.

A pivot pin 28 holds the two scissors-type frames 7, 8 together at their centre point.

In FIG. 9A, the vehicle seat frame is shown in its lowermost position. This corresponds to a contracted spring position, with this being a rapid lowering actuation. In FIG. 9B, the enlarged detail view shows that the notches 26, 27 are now arranged completely in the region of the overpressure gas chamber 21.

In the neutral position of the rod element shown in FIG. 6A, no activities are taking place. In the position of the rod element shown in FIG. 7A, air is supplied to the gas spring only slowly due to the small available cross section of the air intake and discharge openings, so that the seat slowly moves upwards to the neutral position that is set automatically, as shown in FIG. 6A.

In FIG. 8B, a larger cross section of the notches or air supply and discharge openings is available, so that air enters the bore 16 more quickly and the seat accordingly moves upwards more quickly. Before reaching the end position, a slower upward movement or a slowing-down of the upward movement of the vehicle seat takes place, since the rod element automatically moves back towards the neutral position, i.e. towards the section 30. The neutral position of the rod element is then assumed automatically again by the upward movement of the seat and therefore the excursion of the gas spring and thus also the relative movement that takes place between the component 12 and the rod element 15.

A height adjustment in the downward direction accordingly works in precisely the reverse order, i.e. the slide is displaced in the direction of the chamber 22 which brings about a discharge of air from the air spring via the control valve 14.

In the seat frame position shown in FIG. 9, the seat is completely lowered when the rapid lowering button is activated.

Figures 10A, 10B:
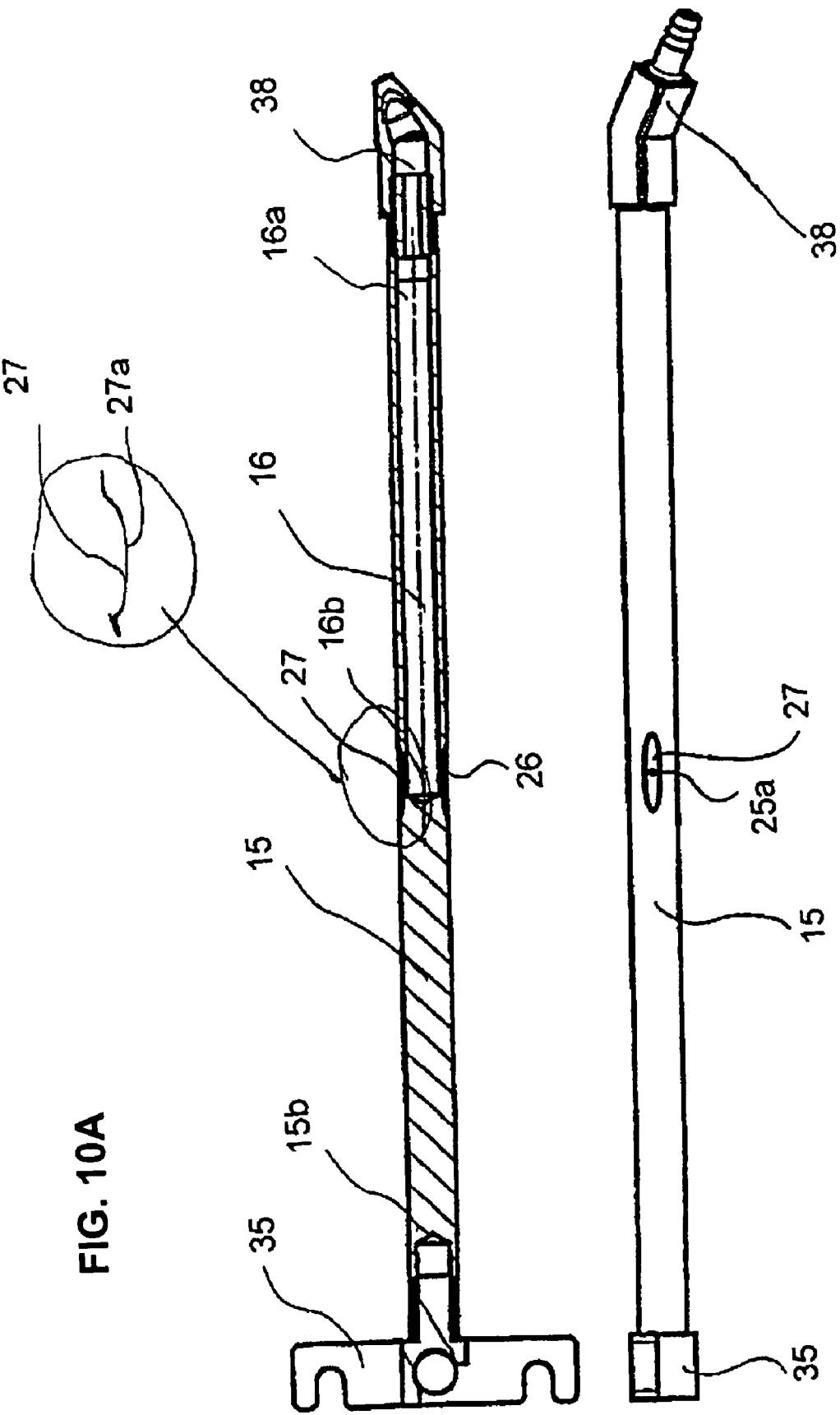
FIG. 10a shows a rod element for the height adjustment device in cross section according to a first variant.
FIG. 10b shows the rod element shown in FIG. 10a rotated through 90°.

FIGS. 10A and 10B show, in a cross-sectional view and in a plan view, a rod element according to a first variant. It can be seen from these figures that the rod element has at its first end 15a the gas spring connection opening 38 for connection to the gas spring 3 and has notches 26, 27, as also shown on an enlarged scale. The notch 27 has the deepest point in its central region 27a, so that a metered intake and discharge of air is possible depending on the position of the notch with respect to the sealing elements 18, 19.

A fixing element 35 for fixing the rod element to the second seat frame part 8 is arranged at the second end 15b of the rod element.

A bore 25a arranged in the air intake and discharge opening establishes the connection to the bore 16 arranged within the rod element.

Figures 11A, 11B:
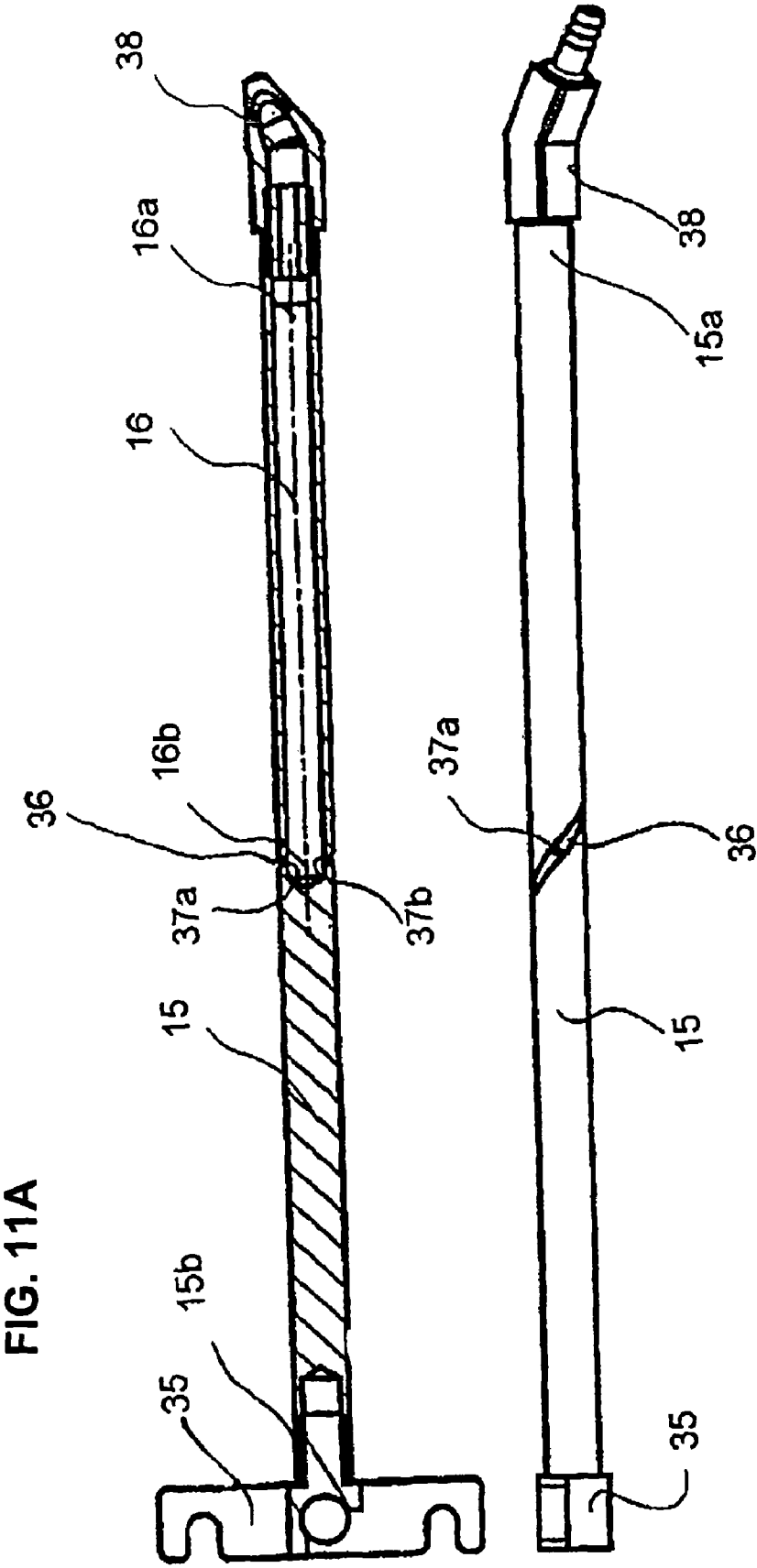
FIG. 11a shows a rod element in cross section according to a second variant.
FIG. 11b shows the rod element according to the second variant rotated through 90°.

FIGS. 11A and 11B show another variant of the rod element in cross section and in plan view. In this variant, there is a notch 36 with through-bores 37a, 37b which is arranged on the surface of the rod element 15, wherein the notch is arranged at an angle with respect to the longitudinal direction of the rod element 15. This advantageously makes it possible, as in the embodiment shown in FIGS. 10A and 10B, for a sealing element or a rubber seal which annularly surrounds the rod element not always to be subjected to stress at the same points when the rod element is displaced relative to the component 12, and thus delays wear on the sealing elements.

Figure 12A:
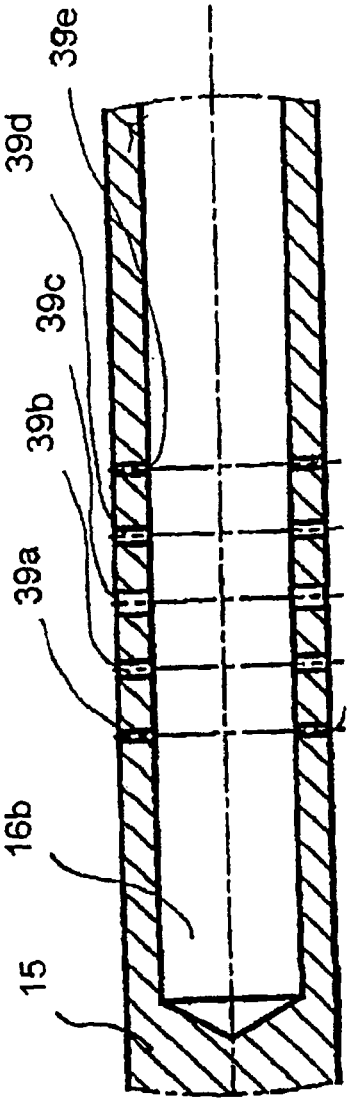
FIG. 12a shows the rod element in cross section according to a third variant.
Figure 12C:
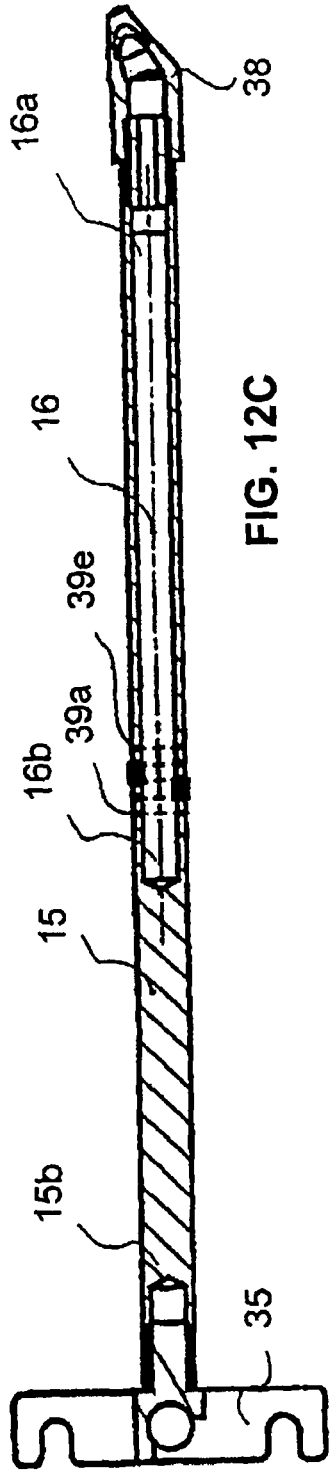
FIG. 12c shows a detail of the rod element according to the third variant.
Figure 12B:
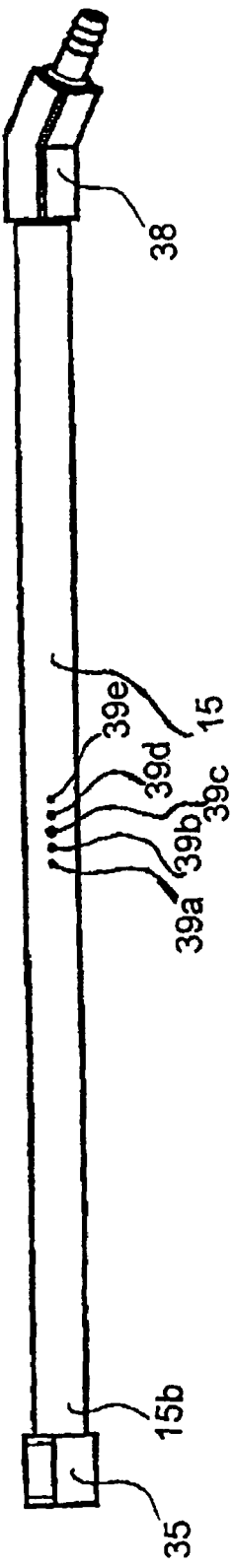
FIG. 12b shows the rod element according to FIG. 12a rotated through 90°.

FIGS. 12A, 12B and 12C show a further variant of the rod element in a cross-sectional view, in plan view and in a detail view. This variant differs from the variants of the rod elements which have notches in that they have individual bores 39a-e which have different diameters.

The diameter of the bores 39a and 39e are graduated such that the bore with the largest diameter is arranged in the centre, i.e. the bore 39c. The bores with the smallest diameter 39a and 39e are arranged at the ends of the row of bores. As in the case of the rod elements with the notches, this advantageously produces the effect that a metered intake and discharge of air via the bore 16 is possible, depending on the displacement travel of the rod element 15.

Figure 13:
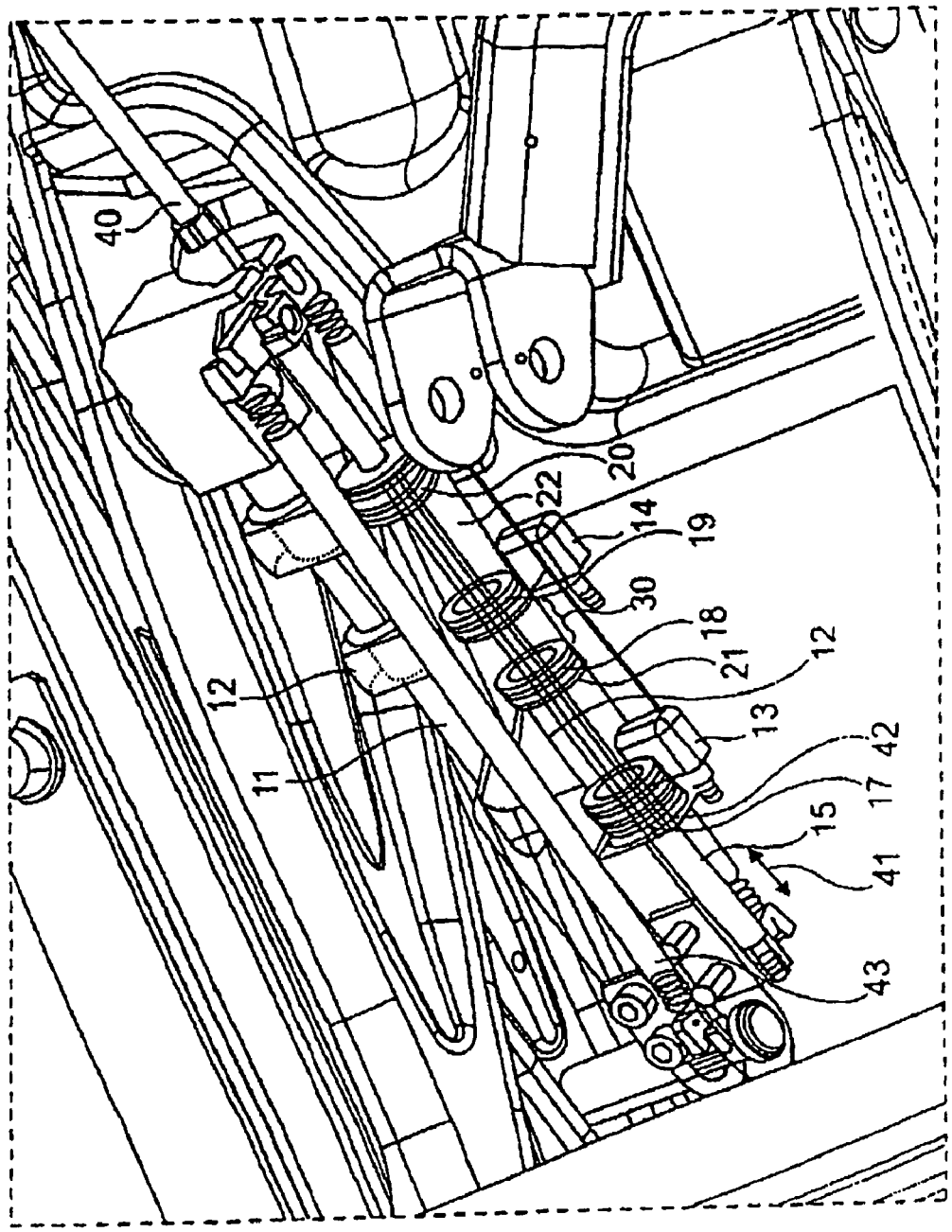
FIG. 13 shows a perspective view of the height adjustment device with an adjustment device in the form according to the invention.

FIG. 13 shows a perspective view of the slide valve with the adjustment device arranged thereon. The adjustment device consists of a Bowden cable 40 which makes it possible for the rod element 15 to be displaced counter to a tensile spring force exerted by the tension springs 42, 43 relative to a component which is arranged in a fixed position on the seat frame part 8 and which arrests the Bowden cable 40. This is indicated by the double arrow 41 and thus allows a targeted and desired height adjustment of the vehicle seat, since the rod element 15 is thus displaced relative to the component 12 and thus relative to the sealing elements 18, 19 and also the gas chambers 21, 22.

All of the features disclosed in the application documents are claimed as essential to the invention in so far as they are novel individually or in combination with respect to the prior art.

| | List of references |
|---|---|
| 1 | backrest |
| 2 | seat part |
| 3 | fluid spring, in particular air spring |
| 3a | damping element |
| 3b, 4a | first ends on the first seat part frame |
| 3c, 4b | second ends on the second seat part frame |
| 4 | control device |
| 5, 6 | rails |

| | -continued |
|---|---|
| | List of references |
| 7 | first seat frame part |
| 8 | second seat part frame |
| 9 | pivot pin |
| 10 | pivot pin |
| 11 | shaft |
| 12 | internally cylindrical component |
| 13, 14 | control valves |
| 15 | rod element |
| 15a | lower end |
| 15b | upper end |
| 16 | cavity/bores |
| 16a | first end |
| 16b | second end |
| 17, 18, 19, 20 | sealing elements |
| 21, 22 | gas chambers |
| 23 | rotation axis on the first seat frame part |
| 24 | rotation axis on the second seat frame part |
| 25a, 25b, 26, 27; 36, 37a, 37b; 39a-e | gas intake and discharge openings |
| 26, 27, 36 | notches |
| 28 | pivot pin |
| 29, 32, 33, 34 | distances |
| 30 | section |
| 31 | opening |
| 35 | fixing element |
| 37a, 37b | through-bores |
| 38 | gas spring connection |
| 39a-e | bores |
| 39a, 39e | diameters |
| 40 | Bowden cable |
| 41 | double arrow |
| 42, 43 | tension springs |

The invention claimed is:

1. Vehicle seat with a height-adjustable seat frame which comprises at least two seat frame parts which can move relative to one another and at least one fluid spring, arranged on the seat frame parts for height adjustment purposes, with at least one control device which is provided for influencing the fluid spring and which comprises at least one valve device with control valves which is attached to the first seat frame part and is designed to control fluid flows for the fluid spring, and also a control element which is provided on the second seat frame part and is designed to actuate the control valves, so that a height adjustment or damping oscillatory movement of the vehicle seat is ensured, characterised in that the valve device comprises an internally cylindrical component with at least one rod element arranged displaceably therein as a control element, wherein at least one fluid intake and discharge opening of the rod element can selectively be assigned to one of the control valves by a relative displacement of the cylindrical component and the rod element with respect to one another.

2. Vehicle seat according to claim 1, characterised in that the fluid intake and discharge opening is on a surface of the rod element and comprises at least one notch extending in the longitudinal direction of the rod element with a deepest point in the center with reference to the longitudinal direction.

3. Vehicle seat according to claim 2, characterised in that the notch extends at an angle with respect to the longitudinal direction of the rod element.

4. Vehicle seat according to claim 1, characterised in that the fluid intake and discharge opening is on a surface of the rod element and comprises at least several bores arranged one behind the other in the longitudinal direction of the rod element, said bores having diameters which increase from bore to bore.

5. Vehicle seat according to claim 1, characterised in that the internally cylindrical component has at least two sealing elements which annularly surround the rod element and are designed to form at least two separate fluid chambers arranged one behind the other within a cylinder jacket of the internally cylindrical component.

6. Vehicle seat according to claim 5, characterised in that a first fluid chamber is connected to a first control valve, a second fluid chamber is connected to a second control valve, and there is a section arranged between the first and the second fluid chamber.

7. Vehicle seat according to claim 1, characterised in that the rod element has along its longitudinal direction, at least partially, a cavity with a fluid spring connection opening at its first end and the fluid intake and discharge opening at its second end.

8. Vehicle seat according to claim 1, characterised by an adjustment device which is arranged at the end of the rod element and is designed to adjust the displaceable rod element by a relative movement with respect to the internally cylindrical component such that a movement of the rod element relative to the cylindrical component that is brought about by the adjustment device causes a height adjustment of the vehicle seat at a predefinable speed by displacing the fluid intake and discharge opening into a first or second fluid chamber.

9. Vehicle seat according to claim 8, characterised by at least one spring element for applying a spring force to the adjustment movement of the rod element.

10. Vehicle seat according to claim 1, characterised in that the rod element is suspended in an articulated manner on the second seat frame part.

11. Vehicle seat according to claim 1, characterised in that the cylindrical component is suspended in an articulated manner on the first seat frame part.

12. Vehicle seat according to claim 1, characterised in that the fluid intake and discharge opening is on a surface of the rod element and comprises at least several bores arranged one behind the other at an angle with respect to the longitudinal direction of the rod element, said bores having diameters which increase from bore to bore.

\* \* \* \* \*